United States Patent [19]

Hasebe et al.

[11] Patent Number: 5,159,885
[45] Date of Patent: Nov. 3, 1992

[54] PROCESS FOR INCINERATING SOLID WASTES AND A PROCESS FOR TREATING SOLID WASTES AND A PROCESS FOR TREATING GASES GENERATED THROUGH INCINERATION OF THESE WASTES

[76] Inventors: Nobuyasu Hasebe; Nobukatsu Hasebe, both of No. 142, 2-chome, Nishiogikita, Suginamiku, Tokyo, Japan

[21] Appl. No.: 645,262

[22] Filed: Jan. 24, 1991

[30] Foreign Application Priority Data

Jun. 27, 1990 [JP] Japan .................................. 2-170699

[51] Int. Cl.⁵ ............................................. F23G 5/00
[52] U.S. Cl. .................... 110/346; 110/235; 110/237
[58] Field of Search ................ 110/346, 235, 237, 239

[56] References Cited

U.S. PATENT DOCUMENTS

| | | | |
|---|---|---|---|
| 1,729,572 | 9/1929 | Evans | 110/235 |
| 4,183,307 | 1/1980 | Spitz et al. | 110/235 |
| 4,438,708 | 3/1984 | Duff | 110/346 |

*Primary Examiner*—Edward G. Favors
*Attorney, Agent, or Firm*—Plante, Strauss & Vanderburgh

[57] ABSTRACT

The present invention relates to a process for incinerating burnable wastes, such as plastics, and to the treatment of the gases generated by such incineration. The waste materials are buried in a landfill, combustion is initiated with an explosion which simultaneously creates a combustion chamber as well as initiating incineration. A fuel and an oxidizing gas are supplied to the combustion chamber and conduits are provided for discharging the gases formed during the incineration process. The angle of introduction of the fuel and/or fuel and air mixture controls the direction of the incineration process. Landfill gases can be fed into the fuel conduit pipe for utilization as a combustion fuel. In addition, when using a liquid fuel, good results have been achieved by combining a suspension of a carbonate or bicarbonate in the fuel which serves to reduce chloride gases such as phosgene which are generated during the decomposition of plastics such as polyvinylchloride. Incineration gases are let into the treatment apparatus for conversion into non-toxic gases which are subsequently catalytically treated to remove environmentally harmful substances.

7 Claims, 1 Drawing Sheet

PROCESS FOR INCINERATING SOLID WASTES AND A PROCESS FOR TREATING SOLID WASTES AND A PROCESS FOR TREATING GASES GENERATED THROUGH INCINERATION OF THESE WASTES

FIELD OF THE INVENTION

The invention relates to a process for incinerating solid wastes, such as plastics, and a process for treating gases generated through incinerating these wastes.

BACKGROUND OF THE INVENTION

Over the last several decades an increasing economic base, and increasing urbanization, has caused a corresponding increase in the volume of solid wastes. Additionally, the properties of these wastes have become more varied, and now include a variety of plastic and chemical products containing a diverse cross section of toxic and harmful products. Generally, either burning or embedding (burial) is applied to treat such wastes, resulting in various complicated environmental and regional social problems. This is especially true in treatment by embedding, making the establishment and expansion of landfills increasingly difficult because of higher land utilization rates, and resistance of residents near the landfill. Meanwhile, the problem increases year-by-year with the growing volume of solid waste.

Among solid wastes the amount of plastics has increased dramatically due to the increased use of these substances in home appliances and automobiles, and as a packaging material for fast foods, disposable diapers and medical wastes. Treating these wastes is especially difficult because they are either slow to degrade, or are completely non-biodegradable, thus shortening the life of a landfill. Such biodegradation that does occur creates its own problems through the release of component elements, such as chlorine. Treatment of these wastes by incineration is even more hazardous due to the release of these hazardous materials in the form of air pollution. More recent research has focused on processes for manufacturing biodegradable plastics which can be degraded by microorganisms present in the soil. however, many problems are yet to e solved with respect to the effectiveness of these new plastics.

SUMMARY OF THE INVENTION

In light of the aforesaid situation, the inventor has focused on the fact that the plastics per se are burnable, and other burnable wastes still exist in an undegraded condition, intending to solve the problem by incineration. After conducting extensive research, he inventor has thus accomplished the present process.

The first aspect of the present invention relates to a process for incineration of burnable waste, characterized in that the energy of an explosive, and of burnable wastes, combustible gases, oil and fat products and refined fossil fuels, is used to initiate the combustion of the said burnable wastes, such as plastics, embedded in a landfill while simultaneously forming a combustion chamber; supplying fuels and an oxidizing gas into said chamber whereby combustion is carried out while discharging the gases generated through incineration to the surface of the land.

Another aspect of the present invention relates to a process for treating gases generated through incinerating the burnable wastes, characterized in that the gases generated through the incineration of burnable wastes are oxidized in the presence of catalysts. Thereby toxic CO, $COCl_2$ and dioxin as chlorinated biphenyl, and sulfur compounds such as thiophene, thiols and carbon disulfide etc., are altogether converted into, $CO_2$ $H_2O$, HCl, and $SO_x$ etc., which are then treated separately.

In the present invention, the energy of an explosive or petroleum products such as LPG, heavy oil, light oil and heating oil, or landfill gas, may be utilized to initiate the combustion of burnable wastes, such as plastic, embedded in a landfill, thereby simultaneously forming a combustion chamber for primary combustion. A fuel and an oxidizing gas are supplied into the said chamber whereby combustion is carried out while discharging the gases from incineration through additional conduits. By such a simple and accurate manner, incineration treatment of wastes can be carried out on a large scale. Further, toxic components contained in the gases from incineration discharged to the surface are oxidized in the presence of a catalyst whereby toxic components, such as carbon monoxide, phosgene, dioxins, and organic and inorganic sulfur compounds such as carbon disulfide, carbonyl sulfide, thio alcohols, olefin polysulfides, and sulfones, are converted into carbon dioxide, water, hydrogen chloride and $SO_x$, which after being generically treated are discharged to the atmosphere in a clean and nontoxic form.

The present invention is constituted as stated above, according to the present invention based on which it is not necessary to set up, as before, an incinerator to treat burnable wastes such as: plastics, rubbers, wooden materials, oil and lipids, cellulose, waste petroleum products and medical wastes. These materials can be simply, conveniently and safely incinerated on a large scale. Meanwhile, the combustion chamber formed after incineration treatment may be rolled uniform with pressure for its next use as a landfill, thus extending the life of the landfill. Also, gases generated upon incineration treatment can be oxidized in the presence of a catalyst to convert them into clean, and completely nontoxic gases, without environmental problems caused by conventional incineration treatment. The following examples serve to illustrate the present invention, but not to claim 7, the scope of the present invention.

DETAILED DESCRIPTION OF THE INVENTION

The wastes applicable to the present invention include those of plastics, rubbers, paper, cellulose, wood, oils and lipids, and waste petroleum products, medical wastes, agricultural wastes and wastes from the food processing industry. In particular, wastes from the medical industry and facilities are increasing in volume and diversifying in kind, and are most often incinerated or disposed of underground, sometimes without proper treatment. These burnable wastes are placed flat on the surface of the land or into an excavated landfill. These wastes are piled up to desired depth by means of earth-moving equipment or other mechanical devices, and covered with soil; mechanical force is then applied downwards to achieve embedding. A series of pipes are sunk into the embedded wastes (FIG. 1) including respectively: a fuel conduit pipe 1 for supplying fuel from the surface; an air conduit pipe 2 for supplying an oxidizing gas; and a number of discharge conduit pipes 3 for discharging the gases generated through incineration. The aforesaid conduit pipes 1, 2, and 3 may be set up by sinking a shaft vertically in the ground by a device such as an auger, the diameter of the shaft being larger than those of the conduit pipes. A casing is then set into the shaft and the conduit pipe is installed into the casing. Both conduit pipes 1 and 2 may be installed in a single casing. There may be many such pipes and casings. Fuel conduit pipe 1 and air conduit pipe 2 are, for example, set up at approximately the enter of the embedded waste, and within a few meters of each other. At the front opening of the fuel conduit pipe 1 the pipe is provided with a nozzle which unctions to control the jet-angle of the fuel or mixture of the fuel and air, whereby the direction of incineration of the wastes can be controlled. Similarly, at the front end of the air conduit pipe 2 there is a nozzle which serves the same function of controlling the direction of incineration, and adjustment of the angle may be coordinated with the nozzle on fuel conduit pipe 1, or made independently or the adjustment may be set in a single fixed condition. Also, if desired, piping may be connected respectively with fuel conduit pipe I and air conduit pipe 2 so as to treat from the landfill. Prior to injection this sewage, and/or waste water must be treated to remove metals, especially heavy metals in the form of hydroxides and sulfides of metals etc., while organic materials are decomposed through combustion. The number and positioning of conduit pipes 3 are defined by the size of the area to be treated, local topography, and considerations of controlling the direction of combustion.

Figure 1:
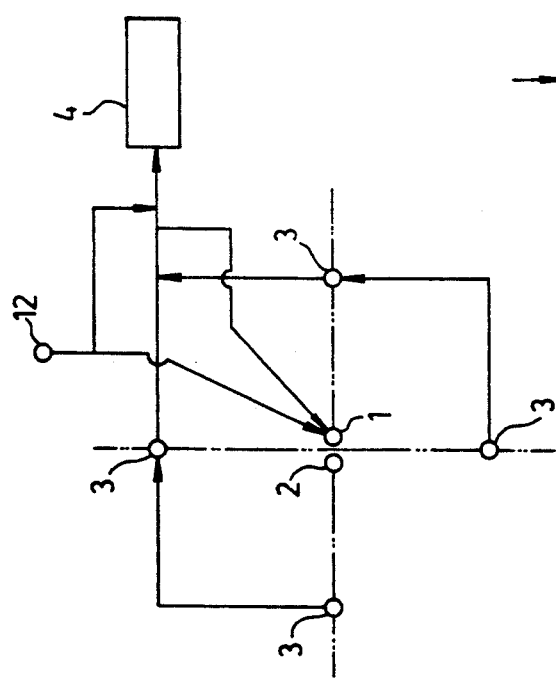
FIG. 1 depicts an arrangement status of fuel conduit pipe 1, air conduit pipe 2 and discharge conduit pipes 3.

In cases in which a smaller quantity of wastes is incinerated, a circular or equilateral polygon scheme may be adopted (FIG. 1). In this scheme, fuel conduit pipe 1 and air conduit pipe 2 are sunk approximately at the center of the embedded wastes and a number of discharge conduit pipes are embedded on the circumference of concentric circles or on the circumference of an equilateral polygon, so that the combustion proceeds with a shape approximating an expanding circle or equilateral polygon radiating from the origin. In variations of this scheme, the origin may be located off the center or near a corner of a site and incineration may proceed in a shape approximating an expanding segment of a circle or polygon. Each conduit pipe 3 may e connected to each other conduit pipe, and all are eventually connected to the incineration-treatment apparatus for treating gases from incineration.

Where a large quantity of wastes is to be incinerated, it is desirable to adopt a linear scheme for the placement of conduit pipes. In this scheme, a primary line on which fuel conduit pipe 1 and air conduit pipe 2 are sunk. A secondary line, which is approximately parallel to or at an angle to the primary line, and a tertiary line that connects the fuel conduit pipe a and air conduit pipe 2 and a conduit pipe 2 on he secondary line are established. A number of discharge conduit pipes 3 are sunk on the primary, secondary and tertiary lines. Each of these conduit pipes is connected to the adjacent pipes. The primary line can have more than two secondary lines on either side or both sides. Between the primary and secondary lines a number of discharge conduit pipes a may be sunk in a grid pattern with each of the conduit pipes connected o adjacent pipes. All of the discharge conduit pipes re eventually connected to the incineration treatment apparatus for treating gases from incineration.

In actual operation, a number of factors need to be considered with regard to placement of conduit pipes. Schemata described above need to be modified or combined to accommodate idiosyncrasies of each incineration site.

Figure 2:
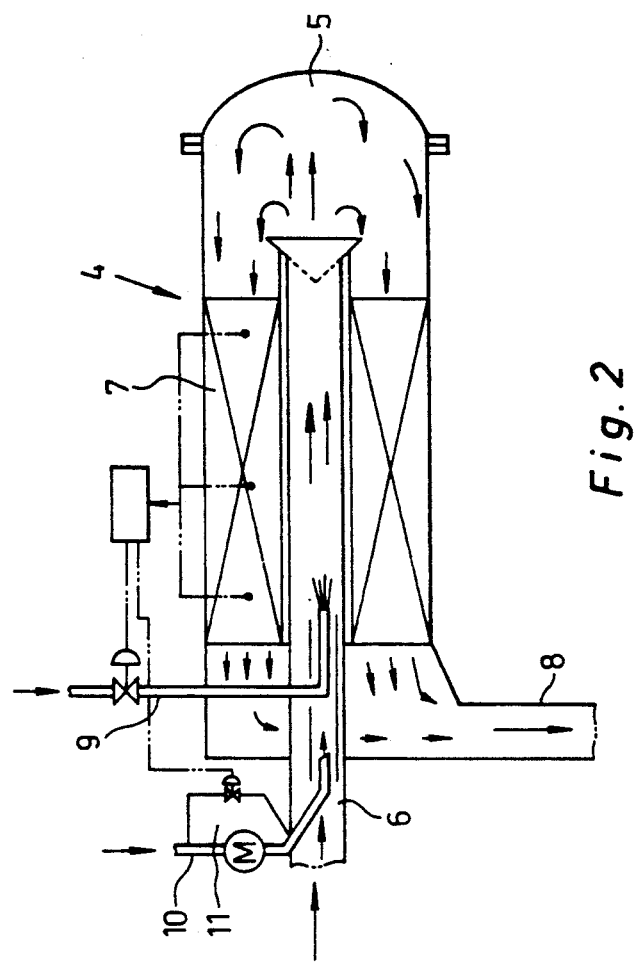
FIG. 2 depicts an arrangement status of gases-from-incineration-treatment apparatus 4.

Now an embodiment of gases from incineration-treatment-apparatus 4 is illustrated in FIG. 2. In said FIG. 2: 5 is a combustion chamber; @ is a charge pipe or gases from incineration which is connected to combustion chamber 5; 7 is a catalyst-fill-layer which is connected to combustion chamber 5, and is connected to the side of catalyst-fill-layer 8; 9 is an oil-supply-pipe connected to aforesaid charge pipe 6, and is provided with a flame nozzle; 10 is an air-supply-pipe connected to charge pipe 6 for auxiliary combustion; 11 is an air blower attached to the said air-supply-pipe 10. In the gases from incineration-treatment-apparatus 4 with the aforesaid structure, gases from discharge conduit pipe 3 is introduced to combustion chamber 5. When the reaction starts, auxiliary fuel or landfill gas is used to keep the catalyst within an active temperature range. For this purpose, fuel (liquid or gas) or landfill gas is introduced via pipe 9, and mixed with air, which may supplied via pipe 10 or independently to pipe 9, for combustion, whereupon the heat generated through combustion is passed through the wall of charge pipe 6 which is thus directly or indirectly heated whereby on one side the temperature of the catalyst-fill-layer is maintained at a specified temperature and on the other side the temperature of the gases from incineration is elevated. The gases from incineration are then introduced into the catalyst-fill-layer 7 so as to be subjected to oxidative decomposition such that the toxic components are converted respectively to carbon dioxide, water, hydrogen chloride, and depending on what is desired, sulfur is converted to sulfur dioxide or hydrogen sulfide; with both of the latter two gases being treated separately, and then being converted to nontoxic salts or being reconverted to sulfur before being discharged to the atmosphere. In order to control the temperature of the catalyst-fill-layer 7, a temperature detector is placed herein, whereby through the sensor of the said temperature detector the amount of oil, fuel, or gases undegraded in the landfill to be supplied through oil-supply-pipe 10 can be adjusted; additionally, air blower 11 attached to air-supply-pipe 10 can be adjusted directly or a ventilation pipe connected to air blower 11 may be set up whereby through the action of the valve of the ventilation pipe adjusted to the signal switch of the temperature sensor, the cooling effect can be increased. Further, at the front end of charge pipe 6 there is set up a cone so that the gases from incineration can be readily diffused, resulting in their easy introduction into catalyst-fill-layer 7.

The catalyst to be filled into the aforesaid catalyst-fill-layer 7 is the oxides of vanadium, copper, lead, cobalt and cadmium whose basicity is stronger than that of vanadium oxide. As an alternative, a mixture of vanadium oxide and potassium persulfate, to which an alkali hydroxide has been added, can be used. The oxides which act to destroy the benzene ring together with its side chains are preferably mixed with porous or nonporous carrier(s). Generally, it is preferable that porous carriers in powder form, such as silica gel and titanium dioxide, with high specific surface areas be made into shaped carriers for use. Furthermore, in the case of a supported catalyst, it is preferable that the carrier be made of alpha-$Al_2O_3$ SiC or aluminum silicate which are low in specific surface area and are non-porous with a pore size of 2.20 mm. In addition, the temperature of the catalyst-fill-layer adjacent to the inlet through which the gases from incineration enter should be sufficiently elevated to intensively carry out the oxidative decomposition, expecting that a desired oxidation degree can be reached. The process for the manufacture of the catalyst may utilize impregnation, concentration-to-dryness, baking, melting with a proviso that the catalyst should be rendered active at a temperature above 200 degrees centigrade.

The primary combustion of the burnable wastes embedded under the land is carried out at an area beneath fuel conduit pipe 1. That is, for example, through fuel conduit pipe a, while injecting combustible petroleum products such as LPG, heavy oil, light oil, and heating oil, or landfill gas, into the wastes and carrying out ignition, or placing an explosive in the wastes and ignit-ing it, so that the burnable wastes are ignited and a combustion chamber necessary for primary combustion of burnable wastes is created. For he aforesaid explosive, trinitrophenol, trinitrotoluene, glycerin trinitrate or their derivative products may be used. Following creation of the combustion chamber a flammable liquid or gas is fed through fuel conduit pipe 1, and an oxidizing gas—such as oxygen—, an oxygen-containing gas, or air is supplied through air conduit pipe 2 so that the wastes are kept in a combustive state. Landfill gas (i.e. methane) can be drawn off via pipe 12, and fed to fuel conduit pipe 1 to supplement, or replace, the initial fuel being used. further, in carrying out combustion, the combustion rate can be controlled by regulating the amount of oxidizing gases, with concurrent use of water or steam being feasible. In accordance with our experience, an alkali metal carbonate such as sodium carbonate, an alkali earth metal carbonate such as calcium carbonate, magnesium carbonate, or an alkali earth metal bicarbonate such as calcium bicarbonate is also very effective when sprayed in the form of a suspension in a liquid fuel—at removing from the burnt products all chlorine-containing, or sulfur-containing compounds in the form of inorganic chlorides or sulfates. These above mentioned carbonates reduce, on a large scale, the amount of poisonous chlorides, such as phosgene, generated upon the combustive decomposition of such plastics as polyvinyl chloride. Further, combustion direction can be controlled by either controlling the amount of the gases-from-incineration discharged from discharge conduit pipes 3 or by combining said measures using temperature recorders and electrothermography.

The gases from incineration are discharged to the surface. At this time, a thermal imaging method using an infrared scanning device can be applied to detect the size and scale of the combustion area, together with its moving directions whereupon new discharge conduit pipes 3 can be set up. The gases from incineration discharged through discharge conduit pipe 3 are introduced into incineration-treatment-apparatus 4 where such toxic gases as carbon monoxide, phosgene, and dioxins, and organic and inorganic sulfur compounds and sulfones are converted into carbon dioxide, water, hydrogen chloride, sulfur dioxide, and hydrogen sulfide, etc., which, after being treated altogether are discharged into the atmosphere in the form of clean nontoxic gases. In addition, allyl, aryl chloride, which is possibly contained in the combustion gases, having been subjected to catalytic oxidation may be treated with steam once or twice so as to convert said allyl, aryl chloride into very simple inorganic compounds i.e. carbon dioxide and hydrogen chloride). In case a power failure occurs to the incineration-treatment-apparatus 4, the supply of air through air conduit pipe 2 will be cut off immediately, thereby resulting in automatic cessation of combustion. As an additional safety measure, at this time, the introduction of water or cO2 into the combustion chamber could be utilized.

At the end of the incineration treatment of wastes, fuel conduit pipe 1, air conduit pipe 2; and discharge pipe 3 may be drawn out, while the combustion area formed under the surface may be rolled flat and uniform with pressure for the next embedding treatment.

EXAMPLE 1

Fuel conduit pipe 1 and air conduit pipe 2, provided with nozzles for which the spray angle could e adjusted, were respectively set up near the center of embedded wastes from the surface. Meanwhile, four discharge conduit pipes 3 were set up on the circumference of a circle, with said two conduit pipes 1 and 2 as its center at a radius of 20 meters, such that the pipings from said conduit pipes 3 were connected to each other. Then the wastes were subjected to incineration treatment under the following conditions:

| | |
|---|---|
| Explosive used (trinitrophenol) | 5 kg |
| Fuel (C grade heavy oil with 5% sulfur) | 1 kg/hr |
| Rate of gaseous fuel supply | 0 nm3/hr |
| Rate of air supply | 20 nm3, hr |
| Alkali used | 0 kg/hr |

The gases from incineration thus produced were discharged through conduit pipe 3, and were then treated in the gases-from-incineration-treatment apparatus 4. After the embedded wastes had been incinerated out, conduit pipes 1, 2 and 3 were withdrawn, and the combustion cavity generated under the land was rolled uniform by means of earth moving equipment.

EXAMPLE 2

Fuel conduit pipe 1, air conduit pipe 2, and discharge conduit pipes 3, were set up in embedded plastic wastes in a manner similar to that of Example 1. Incineration treatment was carried out under the following conditions, and the gases from incineration thus generated were treated in the gases-from-incineration-treatment-apparatus 4.

| | |
|---|---|
| Explosive used (trinitrophenol) | 5 kg |
| Fuel (C grade heavy oil with 5% sulfur) | 1 kg/hr |
| Rate of gaseous fuel supply (gases generated in the landfill) | 60 NM3/hr |
| Rate of air supply | 40 NM3/hr |
| Alkali used ($CaCO_3$) | 10 kg/hr |

EXAMPLE 3

Fuel conduit pipe 1, air conduit pipe 2, and discharge conduit pipes 3 were set up in embedded plastic wastes in a manner similar to that in Example 1. Incineration treatment was carried out under the following conditions and the gases from incineration thus generated were treated in gases-from-incineration apparatus 4.

| | |
|---|---|
| Explosive used (trinitrophenol) | 2 kg |
| Fuel (C grade heavy oil with 5% sulfur) | 0 kg/hr |
| Rate of gaseous fuel supply (gases generated in the landfill) | 100 NM3, hr |
| Rate of air supply | 60 NM3, hr |
| Alkali used (MgCO3) | 10 kg/hr |

EXAMPLE 4

Fuel conduit pipe 1, air conduit pipe 2, and discharge pipes 3, were set up in embedded plastic wastes in a manner similar to that in Example 1. Incineration treatment was carried out under the following conditions and the gases from incineration thus generated were treated in the gases-from-incineration-treatment apparatus 4.

The result of analysis on the gases from incineration thus generated in Examples 1 through 4 are shown in Table 1.

TABLE 1

Analysis of the Gas From Incineration

| Components | Examples | | | |
|---|---|---|---|---|
| | 1 | 2 | 3 | 4 |
| $CO_2$ | 38.13% | 43.65% | 36.19% | 30.32% |
| $O_2$ | 2.01% | 1.37% | 2.29% | 2.35% |
| $SO_2$ | 0.11% | 0.08% | 0.13% | 0.25% |
| CO | 15.19% | 20.43% | 23.84% | 20.66% |
| Phosgene | +++ | +++ | +++ | +++ |
| Dioxin | ++ | + | ++ | ++ |

Note:
+denotes approximately 10 ppm

The results obtained by treating the gases from incineration generated in Examples 1 through 4 with gases-from-incineration-treatment apparatus 4 are shown in Table 2 and Table 3.

For Table 2 the gases were treated at the catalyst temperature of 200 degrees centigrade and with pace speed of 1000 hr-1 (volume of the reaction gases/hr/volume of the catalyst, i.e. the reciprocal of contact time). For the catalyst, $V_2O_5$ —$K_2SO_4$—$SiO_2$ $K_2S_2O_7S$ series was used in mole ratios: $K_2SO_4/V_2O_5=0.98$, 3 was adjusted before use.

TABLE 2

Analysis of the Gas Before and After Treatment

| Components | Before treatment | After treatment |
|---|---|---|
| $H_2S$ | 300 ppm | undetected |
| $CH_3SH$ | 86 ppm | 5 ppm |
| $CS_2$ | 70 ppm | 2 ppm |
| Benzene | 318 ppm | 5 ppm |
| Example of Catalyst Composition for Table 2 | | |
| $V_2O_5$ | 10.80% | |
| $K_2SO_4$ | 10.20% | |
| $K_2S_2O_7$ | 30.40% | |
| $SnO_2$ | 4.50% | |
| Carrier and others | 44.10% | |
| Bulk Density | 0.63 | |

TABLE 3

Analysis of Gas Before and After Treatment

| Components | Before treatment | After treatment |
|---|---|---|
| $C_2H_5$—SH | 300 ppm | undetected |
| Toluene | 86 ppm | 5 ppm |
| $CH_2CL_2$ | 70 ppm | 2 ppm |
| CO | 318 ppm | 5 ppm |
| $COCl_2$ | 109 ppm | undetected |
| Example of Catalyst Composition for Table 3 | | |
| $V_2O_5$ | 14.50% | |
| $K_2SO_4$ | 15.30% | |
| $K_2S_2O_7$ | 34.60% | |
| $CuO_2$ | 3.80% | |
| Carrier and others | 31.80% | |
| Bulk Density | 0.65 | |
| Analysis of Example of Carrier for Table 3 | | |
| $SiO_2$ | 89.68% | |
| $Al_2O_3$ | 6.43% | |
| $Fe_2O_3$ | 1.47% | |
| $K_2O$ | 0.35% | |
| CaO | 0.29% | |
| $TiO_2$ | 0.45% | |
| Ignition Loss | 0.43% | |
| Total | 99.10% | |

What we claim is:

1. A process for the incineration of combustible wastes in land fills and the like, characterized in that
   a. the energy of an explosive is used to initiate the combustion of the said burnable wastes and to simultaneously for at least one combustion chamber for primary combustion;
   b. supplying a fuel and an oxidizing gas into said chamber to maintain combustion; and
   c. conducting gases generated through incineration to the surface for subsequent treatment to remove environmentally harmful and toxic substances.

2. The process according to claim 1, wherein a conduit communicates from the surface with said combustion chamber to supply a fuel and an oxidizing gas selected from the group consisting of oxygen, oxygen containing gases, air and combinations thereof.

3. The process according to claim 1, wherein sewage and drain water generated in a landfill are pretreated so as to remove metal, especially heavy metal in the form of metal sulfides, which landfill gas is then supplied as a gaseous fuel through the fuel conduit pipe.

4. The process according to claim 2, wherein landfill gases or gases generated through the incineration of burnable wastes are used as gaseous fuels.

5. The process according to claim 1, wherein a plurality of discharge conduit pipes for conveying combustion gases from incineration to the surface are disposed in a pattern on said land fill and combustion initiated in said combustion chamber expands toward said discharge conduit pipes in the shape of an expanding circle, polygon, or a segment of a circle or polygon.

6. The process according to claim 1, wherein a part of landfill gases is added to the gases from incineration for precombustion.

7. The process according to claim 2, wherein sewage and grained water generated in a landfill is pretreated so as to remove metal, especially heavy metal in the form of metal sulfides, which landfill gas is then supplied as a gaseous fuel through the fuel conduit pipe.

* * * * *